United States Patent
Kim et al.

(10) Patent No.: US 11,635,633 B2
(45) Date of Patent: Apr. 25, 2023

(54) GEOMETRIC PHASE OPTICAL ELEMENT AND THREE-DIMENSIONAL DISPLAY APPARATUS INCLUDING THE SAME

(71) Applicant: SAMSUNG ELECTRONICS CO., LTD., Suwon-si (KR)

(72) Inventors: Young Kim, Yongin-si (KR); Soonbum Kwon, Asan-si (KR); Byonggwon Song, Seoul (KR); Jungkwuen An, Suwon-si (KR); Kanghee Won, Seoul (KR); Hongseok Lee, Seoul (KR); Jong-Young Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 288 days.

(21) Appl. No.: 17/036,837

(22) Filed: Sep. 29, 2020

(65) Prior Publication Data
US 2021/0302757 A1    Sep. 30, 2021

(30) Foreign Application Priority Data
Mar. 24, 2020 (KR) ........................ 10-2020-0035809

(51) Int. Cl.
*G02B 30/25* (2020.01)
*G02F 1/13* (2006.01)
*G02F 1/1335* (2006.01)

(52) U.S. Cl.
CPC ....... *G02B 30/25* (2020.01); *G02F 1/133528* (2013.01); *G02F 1/133538* (2021.01)

(58) Field of Classification Search
CPC ............... G02B 30/25; G02F 1/133528; G02F 1/133538
(Continued)

(56) References Cited

U.S. PATENT DOCUMENTS 10,197,810 B2    2/2019    Seo et al.
10,490,140 B2    11/2019   Kim et al.
(Continued)

FOREIGN PATENT DOCUMENTS

EP    3 528 041 A1    8/2019
EP    3 608 726 A1    2/2020
(Continued)

OTHER PUBLICATIONS

Communication dated Aug. 4, 2021, from the European Patent Office in European Application No. 21162940.7.

*Primary Examiner* — Jeffery A Williams
(74) *Attorney, Agent, or Firm* — Sughrue Mion, PLLC

(57) ABSTRACT

A geometric phase optical element and a three-dimensional display apparatus including the same are provided. The geometric phase optical element includes: a liquid crystal layer; a first electrode on a surface of the liquid crystal layer; and a second electrode on another surface of the liquid crystal layer, wherein, when no voltage is applied to the first and second electrodes, the liquid crystal layer is configured such that a phase difference according to an arrangement of the liquid crystal is $\pi$ and light transmitted through the liquid crystal layer is diffracted by a first deflection angle, and when a first voltage that causes the phase difference according to the arrangement of the liquid crystal to become $\pi/2$ is applied to the first and second electrodes, the liquid crystal layer is configured such that the light transmitted through the liquid crystal layer is diffracted by a second deflection angle.

21 Claims, 14 Drawing Sheets

(58) Field of Classification Search
USPC .......................................................... 348/58
See application file for complete search history.

(56) References Cited

U.S. PATENT DOCUMENTS

| | | |
|---|---|---|
| 2009/0244415 A1 | 10/2009 | Ide |
| 2015/0022745 A1 | 1/2015 | Kroll et al. |
| 2019/0212700 A1 | 7/2019 | An et al. |
| 2019/0258069 A1 | 8/2019 | Song et al. |
| 2019/0369403 A1* | 12/2019 | Leister ............... G02B 27/0172 |
| 2020/0050145 A1 | 2/2020 | Kim et al. |
| 2020/0272023 A1 | 8/2020 | Won et al. |
| 2021/0041610 A1 | 2/2021 | Saitoh et al. |

FOREIGN PATENT DOCUMENTS

| | | | |
|---|---|---|---|
| JP | 2018-92046 A | 6/2018 | |
| KR | 10-2019-0019993 A | 2/2019 | |
| KR | 10-2020-0103440 A | 9/2020 | |
| WO | 2011/014743 A2 | 2/2011 | |
| WO | 2019/189675 A1 | 10/2019 | |

\* cited by examiner

GEOMETRIC PHASE OPTICAL ELEMENT AND THREE-DIMENSIONAL DISPLAY APPARATUS INCLUDING THE SAME

CROSS-REFERENCE TO RELATED APPLICATION

This application is based on and claims priority under 35 U.S.C. § 119 to Korean Patent Application No. 10-2020-0035809, filed on Mar. 24, 2020, in the Korean Intellectual Property Office, the disclosure of which is incorporated by reference herein in its entirety.

BACKGROUND

1. Field

The disclosure relates to geometric phase optical elements and three-dimensional display apparatuses including the same.

2. Description of Related Art

A geometric phase optical element may operate as a lens or a deflector via a phase difference of a liquid crystal. The geometric phase optical element, compared with a general optical lens, has a greater change in a diopter, is more suitable for a large area display, and has a higher response rate. Also, when a geometric phase optical element operates as a deflector, the geometric phase optical element, compared with a general optical deflector, has a greater deflective angle and a higher efficiency. The geometric phase optical element may be manufactured to be thin and may be used in various display apparatuses.

SUMMARY

Provided is a geometric phase optical element capable of adjusting a deflection angle.

Provided is a three-dimensional display apparatus including a geometric phase optical element.

Additional aspects will be set forth in part in the description which follows and, in part, will be apparent from the description, or may be learned by practice of embodiments of the disclosure.

According to an aspect of an embodiment, a geometric phase optical element includes: a liquid crystal layer on which a liquid crystal is arranged; In accordance with an aspect of the disclosure, a geometric phase optical element includes a liquid crystal layer in which a liquid crystal is arranged and through which light is transmitted; a first electrode on a surface of the liquid crystal layer; and a second electrode on another surface of the liquid crystal layer, wherein, when no voltage is applied to the first electrode and the second electrode, a phase difference, between first light having a first polarization state and second light having a second polarization state perpendicular to the first polarization state, according to an arrangement of the liquid crystal is $\pi$ and the transmitted light is diffracted by a first deflection angle, wherein, when a first voltage is applied to the first electrode and the second electrode, the phase difference according to the arrangement of the liquid crystal is $\pi/2$ and the transmitted light is diffracted by a second deflection angle, wherein, when a second voltage is applied to the first electrode and the second electrode, the phase difference according to the arrangement of the liquid crystal is 0 and the transmitted light is diffracted by a third deflection angle, wherein the first deflection angle is larger than the second deflection angle, and wherein the second deflection angle is larger than the third deflection angle.

The first deflection angle may satisfy the following equation: $\sin\theta_1 = 2\lambda/p$, wherein $\theta_1$ indicates the first deflection angle, $\lambda$ indicates a wavelength of the transmitted light, and p indicates a pitch corresponding to a liquid crystal arrangement cycle of the liquid crystal layer.

The second deflection angle may satisfy the following equation: $\sin\theta_2 = (\lambda/p)$, wherein $\theta_2$ indicates the second deflection angle, $\lambda$ indicates a wavelength of the transmitted light, and p indicates a pitch corresponding to a liquid crystal arrangement cycle of the liquid crystal layer.

The third deflection angle may be 0.

When the first voltage is applied and incident light is left-handed circularly polarized light, the transmitted light may diverge.

The transmitted light may have a phase difference of $\varphi+\pi/4$ with respect to the incident light, wherein $\varphi$ indicates an angle between a direction of a liquid crystal arrangement cycle of the liquid crystal layer and a crystalline axis of the arrangement of the liquid crystal.

When the first voltage is applied and incident light is right-handed circularly polarized light, the transmitted light may converge.

The transmitted light may have a phase difference of $\varphi-\pi/4$ with respect to the incident light, wherein $\varphi$ indicates an angle between a direction of a liquid crystal arrangement cycle of the liquid crystal layer and a crystalline axis of the arrangement of the liquid crystal.

A geometric phase optical element structure may include a plurality of geometric phase optical elements in accordance with an above-noted aspect of the disclosure.

When the number of the plurality of geometric phase optical elements is N, the number of different deflection angles of light diffracted by the geometric phase optical elements may be $3^N - N + 1$.

The liquid crystal layer may include at least one from among an electrically controlled birefringence (ECB) mode, a vertical alignment (VA) mode, a hybrid mode, and a twisted nematic (TN) mode.

In accordance with an aspect of the disclosure, a three-dimensional display apparatus includes a light source; a light guide plate configured to guide a beam incident from the light source; at least one geometric phase optical element configured to change a deflection angle of light incident from the light guide plate; and a spatial light modulator configured to form a hologram image using light transmitted through the at least one geometric phase optical element, wherein the at least one geometric phase optical element includes a liquid crystal layer in which a liquid crystal is arranged and through which the incident light is transmitted, a first electrode on a surface of the liquid crystal layer, and a second electrode on another surface of the liquid crystal layer, wherein, when no voltage is applied to the first electrode and the second electrode, a phase difference, between first light having a first polarization state and second light having a second polarization state perpendicular to the first polarization state, according to an arrangement of the liquid crystal is $\pi$ and light transmitted through the liquid crystal layer is diffracted by a first deflection angle, wherein, when a first voltage is applied to the first electrode and the second electrode, the phase difference according to the arrangement of the liquid crystal is $\pi/2$ and the transmitted light is diffracted by a second deflection angle, wherein, when a second voltage is applied to the first electrode and the second electrode, the phase difference according to the arrangement of the liquid crystal is 0 and the transmitted light is diffracted by a third deflection angle, wherein the first deflection angle is larger than the second deflection angle, and wherein the second deflection angle is larger than the third deflection angle.

The first deflection angle may satisfy the following equation: $\sin \theta_1 = 2\lambda/p$, wherein $\theta_1$ indicates the first deflection angle, $\lambda$ indicates a wavelength of the transmitted light, and p indicates a pitch corresponding to a liquid crystal arrangement cycle of the liquid crystal layer.

The second deflection angle may satisfy the following equation: $\sin \theta_2 = (\lambda/p)$, wherein $\theta_2$ indicates the second deflection angle, $\lambda$ indicates a wavelength of the transmitted light, and p indicates a pitch corresponding to a liquid crystal arrangement cycle of the liquid crystal layer.

The third deflection angle may be 0.

When the first voltage is applied and the incident light is left-handed circularly polarized light, the transmitted light may diverge.

The transmitted light may have a phase difference of $\varphi + \pi/4$ with respect to the incident light, wherein $\varphi$ indicates an angle between a direction of a liquid crystal arrangement cycle of the liquid crystal layer and a crystalline axis of the arrangement of the liquid crystal.

When the first voltage is applied and the incident light is right-handed circularly polarized light, the transmitted light may converge.

The transmitted light may have a phase difference of $\varphi - \pi/4$ with respect to the incident light, wherein $\varphi$ indicates an angle between a direction of a liquid crystal arrangement cycle of the liquid crystal layer and a crystalline axis of the arrangement of the liquid crystal.

The at least one geometric phase optical element may include a plurality of geometric phase optical elements.

When the number of the plurality of geometric phase optical elements is N, the number of different deflection angles of light diffracted by the plurality of geometric phase optical elements may be $3^N - N + 1$.

In accordance with an aspect of the disclosure, a geometric phase deflector includes a liquid crystal layer; and a controller configured to apply a voltage to the liquid crystal layer, wherein, based on the controller applying a first voltage to the liquid crystal layer, incident light passes through the liquid crystal layer without being deflected, wherein, based on the controller applying a second voltage to the liquid crystal layer, the liquid crystal layer deflects left-handed circularly polarized incident light at a first angle and deflects right-handed circularly polarized incident light at a second angle, wherein, based on the controller applying a third voltage to the liquid crystal layer, the liquid crystal layer deflects the left-handed circularly polarized incident light at a third angle and deflects the right-handed circularly polarized incident light at a fourth angle, wherein the first voltage, the second voltage, and the third voltage are different from each other, and wherein the first angle, the second angle, the third angle, and the fourth angle are different from each other.

The first angle and the second angle may be symmetrical about an optical axis of the incident light, and the third angle and the fourth angle may be symmetrical about the optical axis of the incident light.

In accordance with an aspect of the disclosure, a geometric phase lens includes a liquid crystal layer; and a controller configured to apply a voltage to the liquid crystal layer, wherein, based on the controller applying a first voltage to the liquid crystal layer, incident light passes through the liquid crystal layer without being deflected, wherein, based on the controller applying a second voltage to the liquid crystal layer, the liquid crystal layer diffracts left-handed circularly polarized incident light to converge at a first positive focal point and diffracts right-handed circularly polarized incident light to diverge from a first negative focal point, wherein, based on the controller applying a third voltage to the liquid crystal layer, the liquid crystal layer diffracts the left-handed circularly polarized incident light to converge at a second positive focal point and diffracts the right-handed circularly polarized incident light to diverge from a second negative focal point, wherein the first voltage, the second voltage, and the third voltage are different from each other, and wherein the first positive focal point, the first negative focal point, the second positive focal point, and the second negative focal point are different from each other.

The first positive focal point and the first negative focal point may be equidistant from the liquid crystal layer, and the second positive focal point and the second negative focal point may be equidistant from the liquid crystal layer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
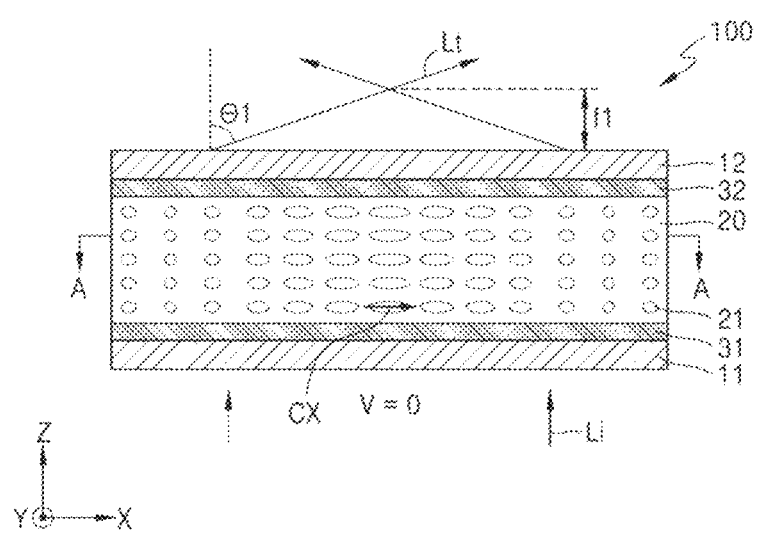
FIG. 1 illustrates a case where no voltage is applied to a geometric phase optical element according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, by referring to the accompanying drawings, geometric phase optical elements and three-dimensional display apparatuses including the same will be described in detail, according to various embodiments. In the drawings hereinafter, like reference numerals refer to like elements, and a size of each element in the drawings may be exaggerated for clarity and convenience of explanation. It will be understood that although the terms "first," "second," etc. may be used herein to describe various components, these components should not be limited by these terms. These components are only used to distinguish one component from another.

The singular forms "a," "an," and "the" are intended to include the plural forms as well, unless the context clearly indicates otherwise. When a part "includes" a certain element, unless it is specifically mentioned otherwise, the part may further include another component and may not exclude the other component. Also, when a certain material layer is described as being on a substrate or another layer, the material layer may be on the substrate or the other layer by directly contacting the same, or a third layer may be arranged between the material layer, and the substrate or the other layer. Also, a material included in each of layers in embodiments to be described below is only an example and other materials may also be used.

Also, the terms, such as "unit" or "module," should be understood as a unit that processes at least one function or operation and that may be embodied in a hardware manner, a software manner, or a combination of the hardware manner and the software manner.

Particular executions described in embodiments are examples and do not limit the technical scope by any means. For the sake of brevity, conventional electronics, control systems, software development and other functional aspects of the systems may not be described. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device.

The operations of all methods described herein can be performed in any suitable order unless otherwise clearly contradicted. The use of any and all examples, or example language (e.g., "such as") provided herein, is intended merely to better illuminate the disclosure and does not pose a limitation on the scope of the disclosure unless otherwise claimed.

FIG. 1 illustrates a geometric phase optical element 100 according to an example embodiment.

The geometric phase optical element 100 may include a liquid crystal layer 20, in which a liquid crystal 21 is arranged, a first electrode 31 on a surface of the liquid crystal layer 20, and a second electrode 32 on another surface of the liquid crystal layer 20. A first substrate 11 may be provided on the first electrode 31 and a second substrate 12 may be provided on the second electrode 32. The first electrode 31 and the second electrode 32 may include transparent electrodes. The first substrate 11 and the second substrate 12 may include, for example, transparent substrates.

FIG. 1 shows an arrangement of the liquid crystal 21, when no voltage is applied to the first electrode 31 and the second electrode 32. A crystalline axis CX of the liquid crystal 21 may be parallel with an incident surface (an X-Y plane in FIG. 1) of light. The liquid crystal 21 may be arranged such that a direction of the crystalline axis CX of the liquid crystal 21 is changed, for example, from a state in which the crystalline axis CX is parallel with the incident surface (the X-Y plane) upon the application of a voltage by the first electrode 31 and the second electrode 32. The liquid crystal 21 may be arranged such that, when a voltage is applied to the liquid crystal layer 20, a phase difference of the liquid crystal layer 20 occurs in a range of 0 degrees to 360 degrees according to the voltage. In other words, the liquid crystal 21 may function as a waveplate in which a phase difference, between first light having a first polarization state and second light having a second polarization state perpendicular to the first polarization state, upon exiting the liquid crystal 21 may be varied according to the applied voltage. The arrangement of the liquid crystal 21 will be described below. When a voltage is off, a phase difference according to the arrangement of the liquid crystal 21 may be $\pi$. In this case, the geometric phase optical element 100 may operate as a half-wave plate. When the voltage is off, the geometric phase optical element 100 may function as a lens or a deflector, via a deflective effect due to a spatial phase difference of the liquid crystal layer 20.

In an example shown in FIG. 1, the geometric phase optical element 100 may include a lens having a first focal distance f1 or a deflector having a first deflection angle θ1. For example, in a case where the geometric phase optical element 100 operates as a lens, when incident light Li is transmitted through the geometric phase optical element 100, transmitted light Lt may be focused at the first focal distance f1. Alternatively, in a case where the geometric phase optical element 100 operates as a deflector, when incident light Li is transmitted through the geometric phase optical element 100, transmitted light Lt may be diffracted by the first deflection angle θ1.

Figure 2:
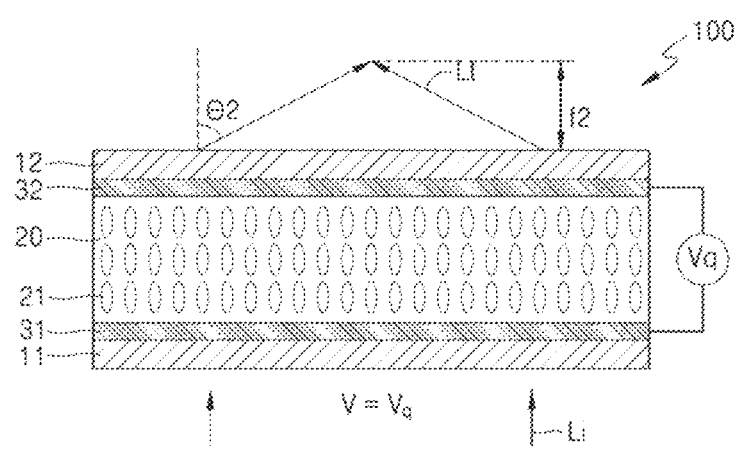
FIG. 2 illustrates a case where a voltage (V=Vq) is applied to a geometric phase optical element to generate a phase difference of $\pi/2$, according to an embodiment.

FIG. 2 illustrates a case where a first voltage Vq that causes a phase difference according to an arrangement of the liquid crystal 21 to become $\pi/2$ is applied to the first and second electrodes 31 and 32. In this case, the geometric phase optical element 100 may operate as a quarter-wave plate. Thus, when light incident into the geometric phase optical element 100 is left-handed or right-handed circularly polarized, transmitted light may be transformed into linearly polarized (LP) light.

In this case, the liquid crystal layer 20 may have a second focal distance f2. The second focal distance f2 may be greater than the first focal distance f1. Also, the liquid crystal layer 20 may operate as a deflector having a second deflection angle θ2. The second deflection angle θ2 may be greater than the first deflection angle θ1. For example, in a case where the geometric phase optical element 100 operates as a lens, when the incident light Li is transmitted through the geometric phase optical element 100, the transmitted light Lt may be focused at the second focal distance f2. Alternatively, in a case where the geometric phase optical element 100 operates as a deflector, when the incident light Li is transmitted through the geometric phase optical element 100, the transmitted light Lt may be diffracted by the second deflection angle θ2.

Figure 3:
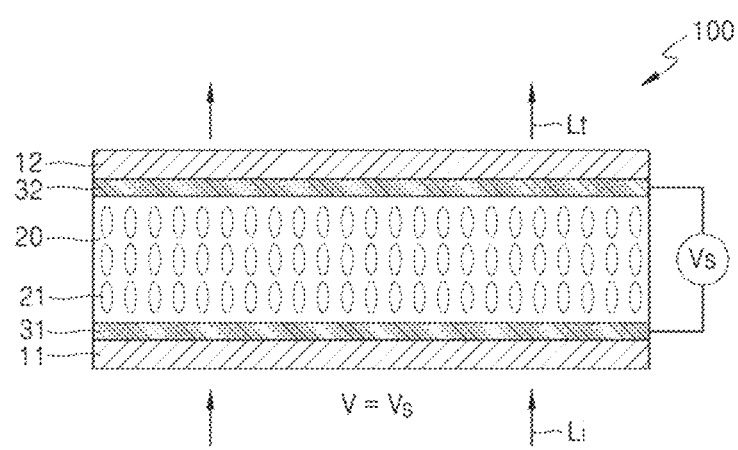
FIG. 3 illustrates a case where a voltage (V=Vs) is applied to a geometric phase optical element to generate a phase difference of $\pi$, according to an embodiment.

FIG. 3 illustrates a case where a second voltage Vs that causes a phase difference of the liquid crystal layer 20 to become 0 is applied to the first and second electrodes 31 and 32. In this case, light is straightforwardly transmitted through the liquid crystal layer 20.

Figure 4:
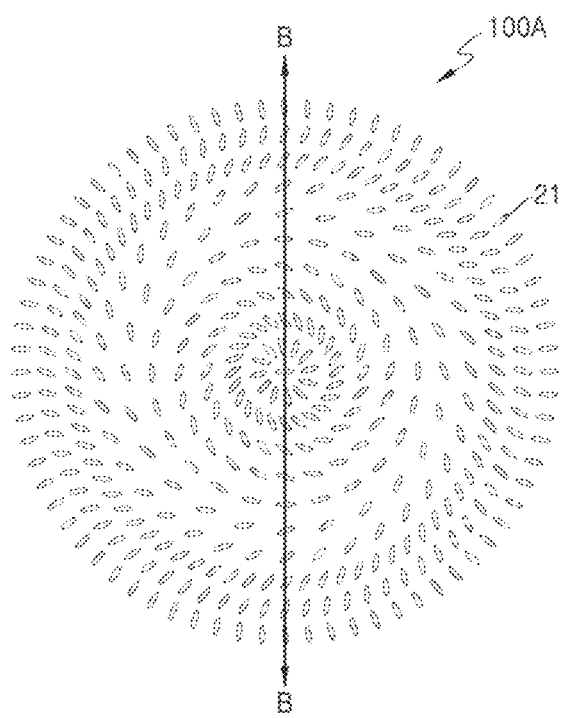
FIG. 4 illustrates an A-A cross-sectional view of the geometric phase optical element of FIG. 1 according to an embodiment.

FIG. 4 illustrates an example of an A-A cross-sectional view of FIG. 1. FIG. 4 illustrates an example, in which a geometric phase optical element 100A operates as a lens. When the first voltage Vq is applied to the first and second electrodes 31 and 32, the liquid crystal 21 may be arranged such that a direction of an arrangement thereof is gradually changed on a concentric circle and a phase difference of the liquid crystal 20 may become π/2. In other words, direction of arrangement of the liquid crystals 20 may gradually change in both the circumferential direction and the radial direction as shown in FIG. 4. When the liquid crystal 21 is arranged on the concentric circle, a line B-B may be an extension line of a diameter of the concentric circle.

Figure 5:
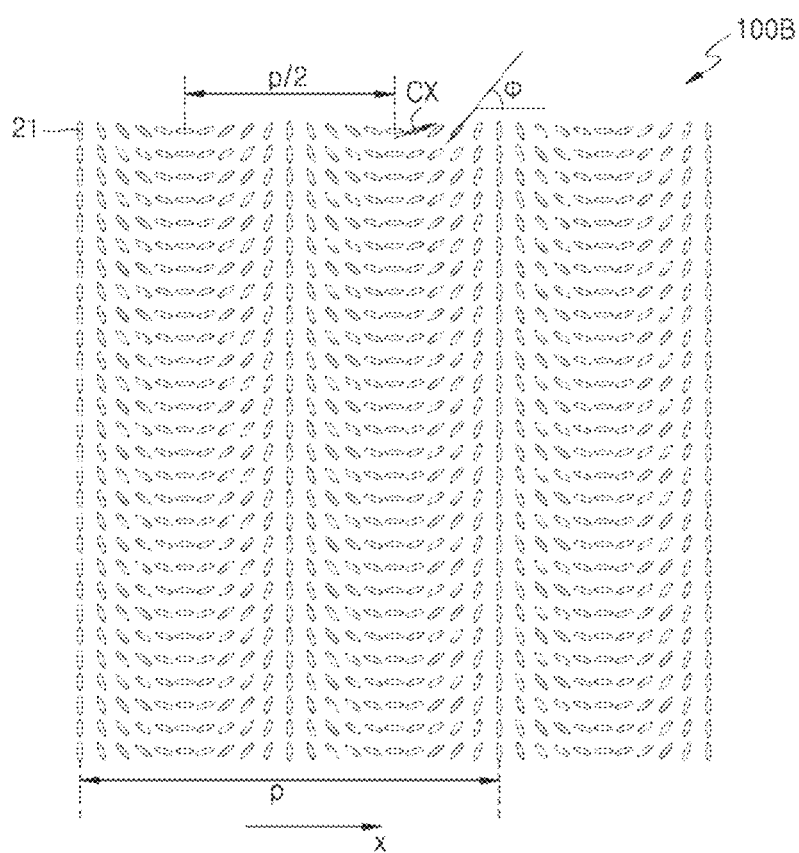
FIG. 5 illustrates an A-A cross-sectional view of the geometric phase optical element of FIG. 1 according to an embodiment.

FIG. 5 illustrates another example of the A-A cross-sectional view of FIG. 1. FIG. 5 illustrates an example in which a geometric phase optical element 100B operates as a deflector. When the liquid crystal 21 is arranged such that the crystalline axis CX of the liquid crystal 21 is gradually changed in a direction (for example, an x direction in FIG. 5) in FIG. 5, a pitch P in the x direction may correspond to a cycle at which the crystalline axis CX is rotated at a 360 degrees angle. Here, the x-axis is referred to as a reference axis. The reference axis may refer to, for example, an axis, with reference to which, an angle of the crystalline axis CX of a liquid crystal molecule is indicated. In other words, the reference axis may be coplanar with the crystalline axes CX of all of the liquid crystals 21 as shown in FIG. 5. The reference axis may extend in a direction of a liquid crystal arrangement cycle. In FIG. 5, φ indicates an angle between the crystalline axis CX of the liquid crystal molecule and the reference axis (the x-axis). A phase difference may occur according to a change in a direction of an arrangement of the liquid crystal 21. The change in the direction of the arrangement of the liquid crystal 21 may be adjusted according to a voltage applied to the liquid crystal layer 20.

The liquid crystal layer 20 may include, for example, at least one of an electrically controlled birefringence (ECB) mode, a vertical alignment (VA) mode, a hybrid mode, and a twisted nematic (TN) mode.

Next, an operational principle of the geometric phase optical element 100B in the case of V=0, V=Vq, V=Vs will be described with reference to FIG. 5.

Referring to FIG. 5, the angle φ of the crystalline axis CX of the liquid crystal 21 may be indicated in Equation 1 as follows.

$$\varphi = 2\pi x/p \qquad \langle \text{Equation 1} \rangle$$

Here, x may indicate a location of the liquid crystal 21 based on the reference axis (the x-axis) and p may indicate a pitch.

Next, a Jones vector of left-handed circularly polarized (LCP) incident light and a Jones vector of right-handed circularly polarized (RCP) incident light may be indicated in Equation 2 as follows.

$$E_\pm = \frac{1}{\sqrt{2}} \begin{bmatrix} 1 \\ \pm i \end{bmatrix} \qquad \langle \text{Equation 2} \rangle$$

Here, $E_+$ may indicate the Jones vector of the LCP incident light and $E_-$ may indicate the Jones vector of the RCP incident light.

In the case of V=0, that is, when a voltage is off, a Jones matrix $J_{GPD}$ of the liquid crystal layer 20 corresponding to a half-wave plate aligned to have the angle φ of the crystalline axis CX based on the reference axis (the x-axis) may be indicated in Equation 3 as follows.

$$J_{GPD} = \begin{bmatrix} \cos\phi & -\sin\phi \\ \sin\phi & \cos\phi \end{bmatrix} \begin{bmatrix} e^{-i\pi/2} & 0 \\ 0 & e^{i\pi/2} \end{bmatrix} \begin{bmatrix} \cos\phi & \sin\phi \\ -\sin\phi & \cos\phi \end{bmatrix} \qquad \langle \text{Equation 3} \rangle$$

A Jones vector $E'_\pm$ of light transmitted through the liquid crystal layer 20 may be indicated in Equation 4 as the product of the Jones matrix $J_{GPD}$ and the Jones vector $E_\pm$ as follows.

$$E'_\pm = J_{GPD} E_\pm = \qquad \langle \text{Equation 4} \rangle$$

$$\frac{1}{\sqrt{2}} \begin{bmatrix} \cos\phi & -\sin\phi \\ \sin\phi & \cos\phi \end{bmatrix} \begin{bmatrix} e^{-i\pi/2} & 0 \\ 0 & e^{i\pi/2} \end{bmatrix} \begin{bmatrix} \cos\phi & \sin\phi \\ -\sin\phi & \phi\cos \end{bmatrix} \begin{bmatrix} 1 \\ \pm i \end{bmatrix} =$$

$$\frac{e^{\pm i 2\phi}}{\sqrt{2}} \begin{bmatrix} 1 \\ \mp i \end{bmatrix}$$

Figure 7A:
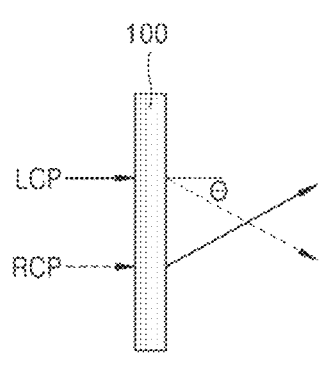
FIGS. 7A and 7B illustrate a change of a deflection angle of light transmitted through a geometric phase optical element, when a voltage (V=0, V=Vs) is applied to the geometric phase optical element.

Referring to FIG. 5, when the incident light is LCP light, the transmitted light may become RCP light and a phase change of 2φ may occur so that the transmitted light may be diffracted in a bottom direction as shown in FIG. 7A. When the incident light is RCP light, the transmitted light may become LCP light and a phase change of −2φ may occur so that the transmitted light may be diffracted in an upper direction as shown in FIG. 7A.

In the case of V=0, incident LCP light may be deflected at a first angle and RCP light may be deflected at a second angle that is symmetrical to the first angle about an optical axis of the incident light. In the case of V=Vq, incident LCP light may be deflected at a third angle different from the first angle and RCP light may be deflected at a fourth angle that is symmetrical to the third angle about the optical axis of the incident light. In the case of V=Vs, the incident LCP light and the incident RCP light may both pass through undeflected.

Figure 6:
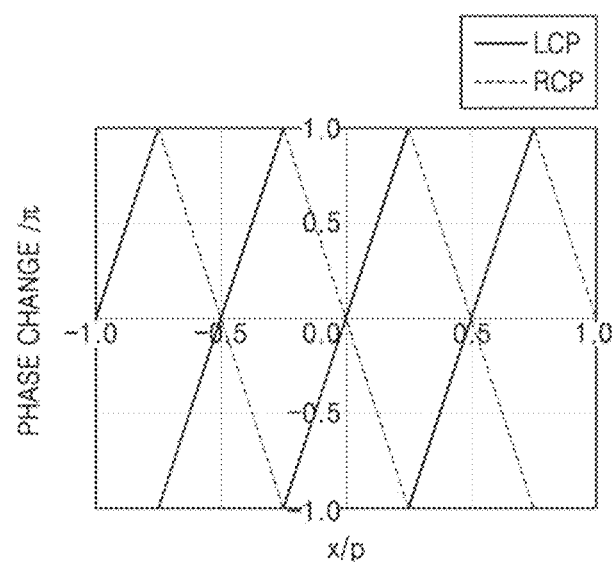
FIG. 6 illustrates a phase change according to a location of a geometric phase optical element, when a voltage (V=0) is applied to the geometric phase optical element.

FIG. 6 illustrates a phase change according to a location of a liquid crystal, in the case of V=0. Solid lines may indicate LCP light and dashed lines may indicate RCP light. The phase change of 2φ may occur with respect to the LCP incident light, and thus, referring to Equation 1, φ=4πx/p and FIG. 6 illustrates (the phase change/π) with respect to (x/p). For example, when (x/p)=0.5 with respect to the LCP incident light, the phase change may become 0, and when (x/p)=0.25 with respect to the LCP incident light, the phase change may become π.

The phase change of −2φ may occur with respect to the RCP incident light, and thus, referring to Equation 1, φ=(−

4π)(x/p) and FIG. 6 illustrates (the phase change/π) with respect to (x/p). For example, when (x/p)=0.5 with respect to the RCP incident light, the phase change may become 0, and when (x/p)=0.25 with respect to the RCP incident light, the phase change may become −π.

When a voltage is off, a deflection angle θ may therefore be indicated in Equation 5 as follows.

$$\sin\theta = \frac{OPD}{x} = \frac{\lambda 2\phi/2\pi}{P\phi/2\pi} = \frac{2\lambda}{P} \qquad \langle\text{Equation 5}\rangle$$

Here, OPD may indicate an optical path difference between transmitted light passing through a point x=0 (at which an angle of a crystalline axis is 0) and transmitted light passing through a point x=x1 (at which the angle of the crystalline axis is φ), λ may indicate a wavelength of light, p may indicate a pitch of an arrangement of the liquid crystal, and φ may indicate an angle of a crystalline axis of the liquid crystal. Referring to Equation 5, when the voltage is off, the deflection angle θ may be determined based on the wavelength λ of the light and the pitch p of the arrangement of the liquid crystal.

Figure 7B:
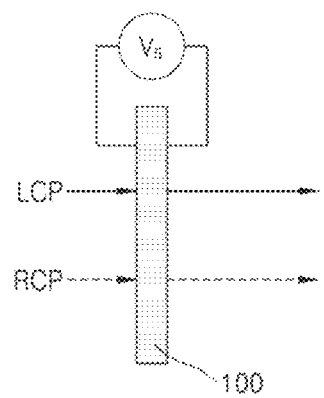

Next, when a voltage is applied to a liquid crystal layer such that a liquid crystal molecule is perpendicularly arranged, the phase change may become 0, and thus, light may be straightforwardly transmitted through a geometric phase optical element as shown in FIG. 7B.

Figure 8:
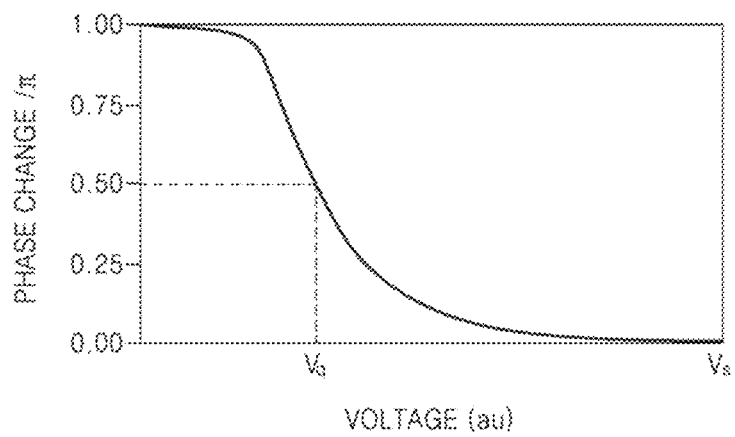
FIG. 8 illustrates a phase change according to a voltage of a geometric phase optical element according to an embodiment.

Referring to FIG. 8, a geometric phase optical element may have a change in a phase difference according to a voltage applied thereto. Referring to FIG. 8, a voltage Vq may be applied to the geometric phase optical element so that the phase difference may become π/2. In this case, the geometric phase optical element may operate as a quarter-wave plate.

Next, a Jones matrix when the voltage Vq is applied to a liquid crystal layer so that the phase difference becomes π/2 is indicated in Equation 6 as follows.

$$J_{GPD} = \begin{bmatrix} \cos\phi & -\sin\phi \\ \sin\phi & \cos\phi \end{bmatrix} \begin{bmatrix} e^{-i\pi/4} & 0 \\ 0 & e^{i\pi/4} \end{bmatrix} \begin{bmatrix} \cos\phi & \sin\phi \\ -\sin\phi & \cos\phi \end{bmatrix} \qquad \langle\text{Equation 6}\rangle$$

Here, a Jones vector of transmitted light may be calculated as follows in Equation 7.

$$E'_\pm = J_{GPD}E_\pm =$$
$$\frac{1}{\sqrt{2}}\begin{bmatrix} \cos\phi & -\sin\phi \\ \sin\phi & \cos\phi \end{bmatrix}\begin{bmatrix} e^{-i\pi/4} & 0 \\ 0 & e^{i\pi/4} \end{bmatrix}\begin{bmatrix} \cos\phi & \sin\phi \\ -\sin\phi & \phi\cos \end{bmatrix}\begin{bmatrix} 1 \\ \pm i \end{bmatrix} =$$
$$e^{\pm i(\phi\pm\pi/4)}\begin{bmatrix} \pm\sin(\phi\pm\pi/4) \\ \mp\cos(\phi\pm\pi/4) \end{bmatrix} \qquad \langle\text{Equation 7}\rangle$$

Here, E'$_+$ may indicate a Jones vector of LCP incident light and E'$_-$ may indicate a Jones vector of RCP incident light.

Figure 10A:
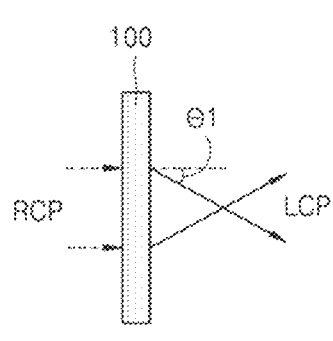
FIGS. 10A, 10B, and 10C illustrate path diagrams after right-handed circularly polarized light is transmitted through a geometric phase optical element, when a voltage (V=0, V=Vq, V=Vs) is applied to the geometric phase optical element.
Figure 10B:
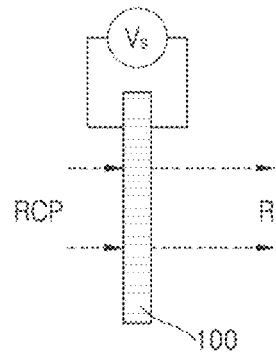
Figure 10C:
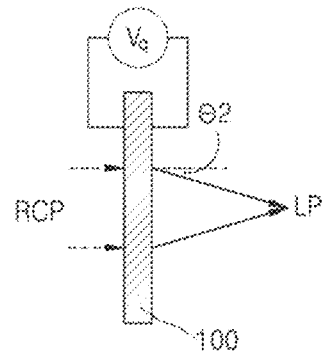

Based on Equation 7, when the incident light is RCP light, the transmitted light may become LP light and a phase difference of φ−π/4 may occur as shown in FIG. 10C.

FIG. 10A illustrates that RCP incident light is transmitted by a first deflection angle θ1 to converge at a first positive focal point, in the case of V=0. FIG. 10B illustrates that RCP incident light is straightforwardly transmitted (in this case, the deflection angle is 0), in the case of V=Vs. FIG. 10C illustrates that RCP incident light is transmitted by a second deflection angle θ2 to converge at a second positive focal point different from the first positive focal point. The second deflection angle θ2 may have a value that is a half of the first deflection angle θ1.

Referring to Equation 7, when the incident light is RCP light, the transmitted light may become LP light and a phase difference of φ−π/4 may occur, and when the incident light is LCP light, the transmitted light may become LP light and a phase difference of φ+π/4 may occur.

An optical path difference (OPC) of the transmitted light passing through a point x=0 (at which an angle of a crystalline axis is 0) and the transmitted light passing through a point x=x1 (at which the angle of the crystalline axis is φ) is indicated in Equation 8 as follows.

$$OPD = \lambda\phi/2\pi \qquad \text{<Equation 8>}$$

Thus, the deflection angle θ may be indicated in Equation 9 as follows.

$$\theta = \sin^{-1}\left(\frac{OPD}{x}\right) = \sin^{-1}\left(\frac{\lambda\phi/2\pi}{P\phi/2\pi}\right) = \sin^{-1}\left(\frac{\lambda}{P}\right) \qquad \langle\text{Equation 9}\rangle$$

Comparing Equation 5 corresponding to V=0 with Equation 9 corresponding to V=Vq, sin θ corresponding to V=Vq may become reduced to a half of sin θ corresponding to V=0. Thus, in the case of V=Vq, the deflection angle θ may be reduced to about a half of the deflection angle θ in the case of V=0. Also, a second focal distance in the case of V=Vq may be greater than a first focal distance in the case of V=0.

Figure 9:
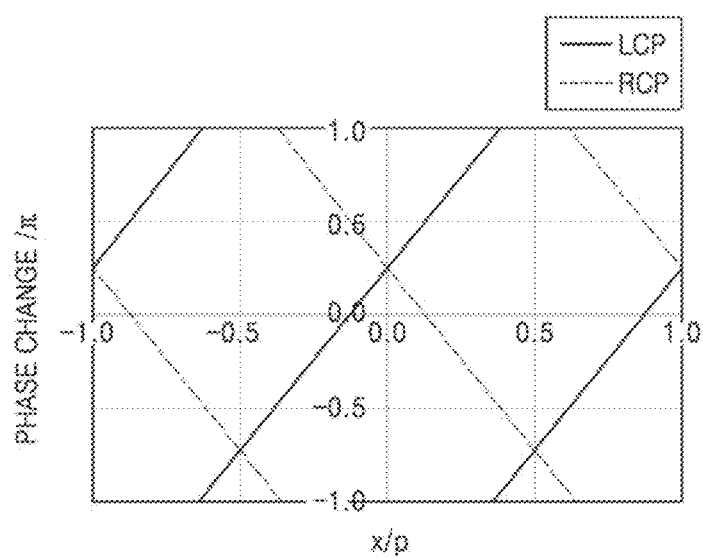
FIG. 9 illustrates a phase change according to a location of a geometric phase optical element, when a voltage (V=Vq) is applied to the geometric phase optical element.

FIG. 9 illustrates a phase change according to a location x of a geometric phase optical element, when a voltage V=Vq is applied to the geometric phase optical element.

Referring to Equation 1, in the case of V=Vq, a phase difference of φ−π/4 occurs with respect to RCP incident light, and thus, Equation 1 may be modified as follows in Equation 10.

$$(\varphi-\pi/4)=2\pi x/p$$

$$\varphi=(2\pi)x/p-(\pi/4) \qquad \text{<Equation 10>}$$

Referring to Equation 1, in the case of V=Vq, a phase difference of φ+π/4 occurs with respect to LCP incident light, and thus, Equation 1 may be modified as follows in Equation 11.

$$(\varphi+\pi/4)=2\pi x/p$$

$$\varphi=(2\pi)x/p+(\pi/4) \qquad \text{<Equation 11>}$$

As described above, the voltage Vq that causes the phase difference of π/2 may be applied to the geometric phase optical elements 100, 100A, and 100B, so that there may further be a third deflection angle between the first deflection angle and the second deflection angle. Alternatively, when the geometric phase optical elements 100, 100A, and 100B operate as a lens, there may further be a third focal distance between the first focal distance and the second focal distance. Also, the geometric phase optical elements 100, 100A, and 100B according to the example embodiments may have increased deflective efficiency, since there are no inflection points in the phase change.

FIG. 10A illustrates that, when, in the case of V=0, light of the RCP light is incident, the light transmitted through the geometric phase optical element 100 may be transformed into the LCP light and may be diffracted by a deflection angle of θ1.

FIG. 10B illustrates that, in the case of V=Vs, a phase difference of the liquid crystal layer 20 of the geometric phase optical element 100 may become 0 and the RCP light may be straightforwardly transmitted through the geometric phase optical element 100.

FIG. 10C illustrates that, in the case of V=Vq, a phase difference of the liquid crystal layer 20 of the geometric phase optical element 100 may become π/2 and the RCP light may be transformed into the LP light and may be diffracted by a deflection angle of θ2 (θ2<θ1). Here, Vs>Vq. In this case, a beam may be converged.

Figure 11A:
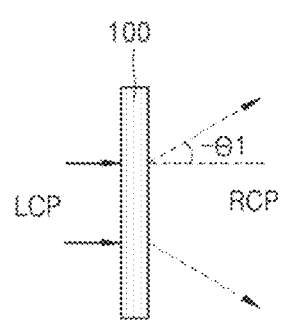
FIGS. 11A, 11B, and 11C illustrate path diagrams after left-handed circularly polarized light is transmitted through a geometric phase optical element, when a voltage (V=0, V=Vq, V=Vs) is applied to the geometric phase optical element.

FIG. 11A illustrates that, when, in the case of V=0, the LCP light is incident, the light transmitted through the geometric phase optical element 100 may be transformed into the RCP light and may be diffracted by a deflection angle of −θ1 to diverge from a first negative focal point, wherein the first negative focal point and the first positive focal point are equidistant from the geometric phase optical element 100.

Figure 11B:
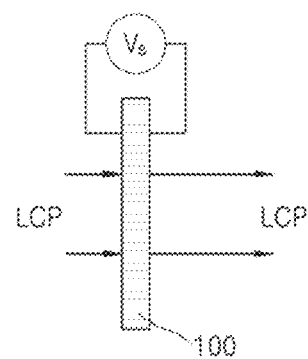

FIG. 11B illustrates that, in the case of V=Vs, a phase difference of the liquid crystal layer 20 of the geometric phase optical element 100 may become 0 and the LCP light may be straightforwardly transmitted through the geometric phase optical element 100.

Figure 11C:
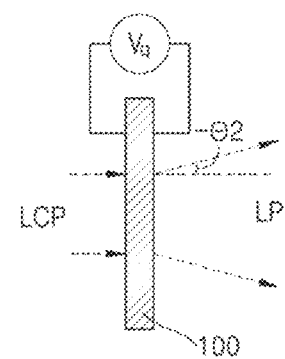

FIG. 11C illustrates that, in the case of V=Vq, a phase difference of the liquid crystal layer 20 of the geometric phase optical element 100 may become π/2 and the LCP light may be transformed into the LP light and may be diffracted by a deflection angle of −θ2 (θ2<θ1) to diverge from a second negative focal point, wherein the second negative focal point and the second positive focal point are equidistant from the geometric phase optical element 100. In this case, a beam may be diverged.

Figure 12A:
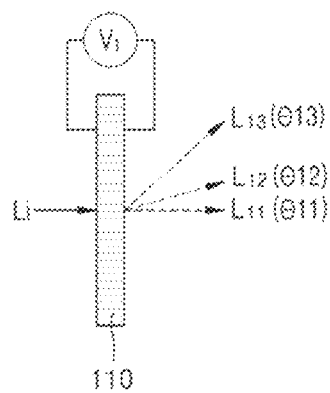
FIGS. 12A, 12B, and 12C illustrate a structure in which a plurality of geometric phase optical elements are stacked, according to an embodiment.
Figure 12B:
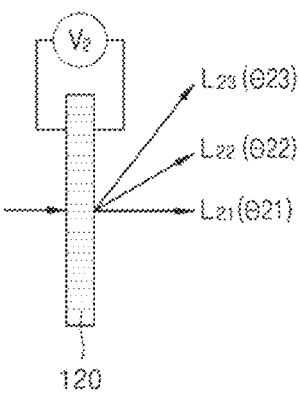
Figure 12C:
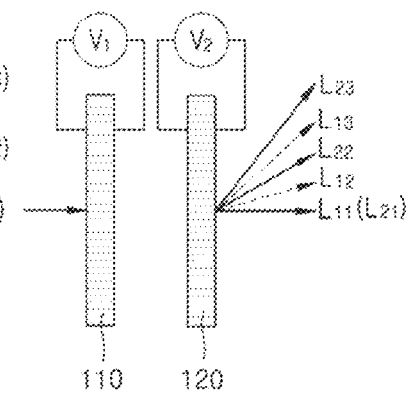

FIGS. 12A, 12B, and 12C illustrate a case where there may be two or more geometric phase optical elements according to an example embodiment. In other words, FIGS. 12A, 12B, and 12C show a geometric phase optical element structure that may include a plurality of geometric phase optical elements.

FIG. 12A illustrates a first geometric phase optical element 110. Incident light Li may be transmitted through the first geometric phase optical element 110 as first transmitted light $L_{11}$, second transmitted light $L_{12}$, and third transmitted light $L_{13}$, according to an applied voltage V1. In the case of V1=Vs1, the first transmitted light $L_{11}$ may be transmitted by a first deflection angle θ11. In the case of V1=Vq1, the second transmitted light $L_{12}$ may be transmitted by a second deflection angle θ12. In the case of V1=0, the third transmitted light $L_{13}$ may be transmitted by a third deflection angle θ13. Here, Vq1<Vs1, wherein Vq1 may be a voltage that causes a phase difference of a liquid crystal layer of the first geometric phase optical element 110 to become π/2. Here, θ11<θ12<θ13. Here, the deflection angle may indicate an angle from a normal line of the first geometric phase optical element 110. The first transmitted light $L_{11}$ may be light that is straightforwardly transmitted. In other words, the first deflection angle θ11 may be 0 degrees.

FIG. 12B illustrates a second geometric phase optical element 120. Incident light Li may be transmitted through the second geometric phase optical element 120 as fourth transmitted light $L_{21}$, fifth transmitted light $L_{22}$, and sixth transmitted light $L_{23}$, according to an applied voltage V2. In the case of V2=Vs2, the fourth transmitted light $L_{21}$ may be transmitted by a fourth deflection angle θ21, in the case of V2=Vq2, the fifth transmitted light $L_{22}$ may be transmitted by a fifth deflection angle θ22, and in the case of V2=0, the sixth transmitted light $L_{23}$ may be transmitted by a sixth deflection angle θ23. Here, Vq2<Vs2, wherein Vq2 may be a voltage that causes a phase difference of a liquid crystal layer of the second geometric phase optical element 120 to become π/2. Here, θ21<θ22<θ23. The fourth transmitted light $L_{21}$ may be light that is straightforwardly transmitted. In other words, the fourth deflection angle θ21 may be 0 degrees.

Referring to Equation 9, the deflection angle θ may be changed according to a wavelength λ of light and a pitch p of a liquid crystal layer. Thus, the transmitted light may have different deflection angles according to the pitches p of the liquid crystal layers of the first and second geometric phase optical elements 110 and 120.

Referring to FIG. 12C, when the first geometric phase optical element 110 and the second geometric phase optical element 120 are stacked together, and the first voltage V1 is applied to the first geometric phase optical element 110 and the second voltage V2 is applied to the second geometric phase optical element 120, transmitted light having five deflection angles may be generated. Here, the transmitted light $L_{11}$ straightforwardly transmitted through the first geometric phase optical element 110 and the transmitted light $L_{21}$ straightforwardly transmitted through the second geometric phase optical element 120 may both have deflection angles of 0 degrees.

For example, when N geometric phase optical elements are stacked, the number of deflection angles may be $3^N-N+1$. Deflection angles may be changed in more detail by using a plurality of geometric phase optical elements.

Figure 13:
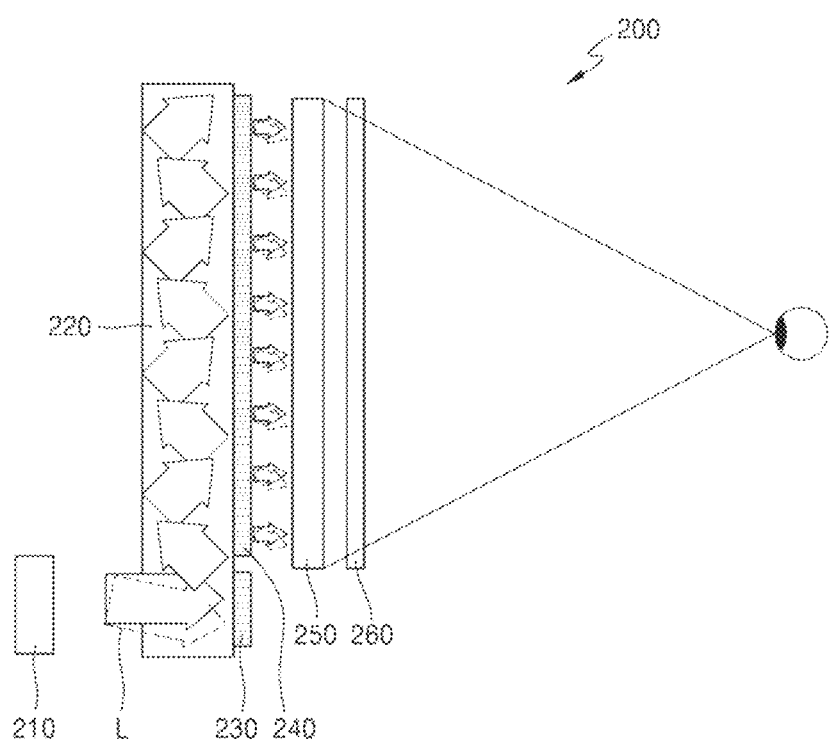
FIG. 13 schematically illustrates a three-dimensional display apparatus according to an embodiment.

FIG. 13 is a cross-sectional view of a schematic structure of a three-dimensional display apparatus 200 according to an embodiment.

The three-dimensional display apparatus 200 may include a light source 210 configured to provide a beam L, a light guide plate 220 configured to guide the beam L provided by the light source 210, a geometric phase optical element 250 configured to diffract the beam L, and a spatial light modulator 260 configured to form a hologram image.

The light source 210 may emit coherent light including a plurality of wavelength ranges. In order to provide light having a high coherence, for example, a laser diode (LD) may be used as the light source 210. However, when light has a certain spatial coherence, the light may be diffracted and modulated by the spatial light modulator 260. Thus, as the light source 210, for example, a light-emitting diode (LED) may also be used. In addition to the LED, other light sources configured to emit light having spatial coherence may be used. Also, in FIG. 13, the light source 210 is illustrated as only one block for convenience. However, the light source 210 may include a plurality of arrays of point sources of light. For example, the light source 210 may include a plurality of red emission lasers, a plurality of green emission lasers, and a plurality of blue emission lasers.

The light guide plate 220 may include transparent glass or transparent plastic. For example, as a material of the light guide plate 220, polymethyl methacrylate (PMMA) may be used. The light guide plate 220 may have, for example, a cuboidal shape to function as a light waveguide for transmitting a beam. The beam L incident into an end of the light guide plate 220 may be transmitted to the other end of the light guide plate 220 via total internal reflection.

The geometric phase optical element 250 may change a deflection angle of light, which allows a change of a viewpoint of the three-dimensional display apparatus 200.

Any of the geometric phase optical elements 100, 100A, and 100B, and the first and second geometric phase optical elements 110 and 120 described with reference to FIGS. 1 through 12 may be applied as the geometric phase optical element 250.

The spatial light modulator 260 may be configured to form a hologram pattern for diffracting and modulating an incident beam according to a hologram signal. As the spatial light modulator 260, any one of a phase modulator configured to perform only phase modulation, an amplitude modulator configured to perform only amplitude modulation, and a complex modulator configured to perform both phase modulation and amplitude modulation may be used. In FIG. 13, the spatial light modulator 260 is illustrated as a transmissive spatial light modulator. However, a reflective spatial light modulator may also be used. As the transmissive spatial light modulator, the spatial light modulator 260 may include, for example, a semiconductor modulator based on a compound semiconductor, such as GaAs, or a liquid crystal device (LCD). As the reflective spatial light modulator, the spatial light modulator 260 may include, for example, a digital micro-mirror device (DMD) or a liquid crystal on silicon (LCoS).

The light guide plate 220 may further include an input coupler 230, and an output coupler 240 configured to emit a beam that is to proceed by being guided by the light guide plate 220. The input coupler 230 may increase the optical coupling efficiency for the light guide plate 220. The output coupler 240 may include a grating. The grating may increase the optical output efficiency by using the diffractive efficiency of the emitted light.

A directional beam emitted through the light guide plate 220 may be incident into the spatial light modulator 260 via the geometric phase optical element 250. The spatial light modulator 260 may form a hologram pattern having an interference fringe for modulating the incident beam. The incident beam may be diffracted and modulated via the hologram pattern formed by the spatial light modulator 260, and thus, a hologram image may be generated at a certain viewing location. A left-handed hologram image and a right-handed hologram image may be generated at a left-handed location and a right-handed location, respectively.

Figure 14:
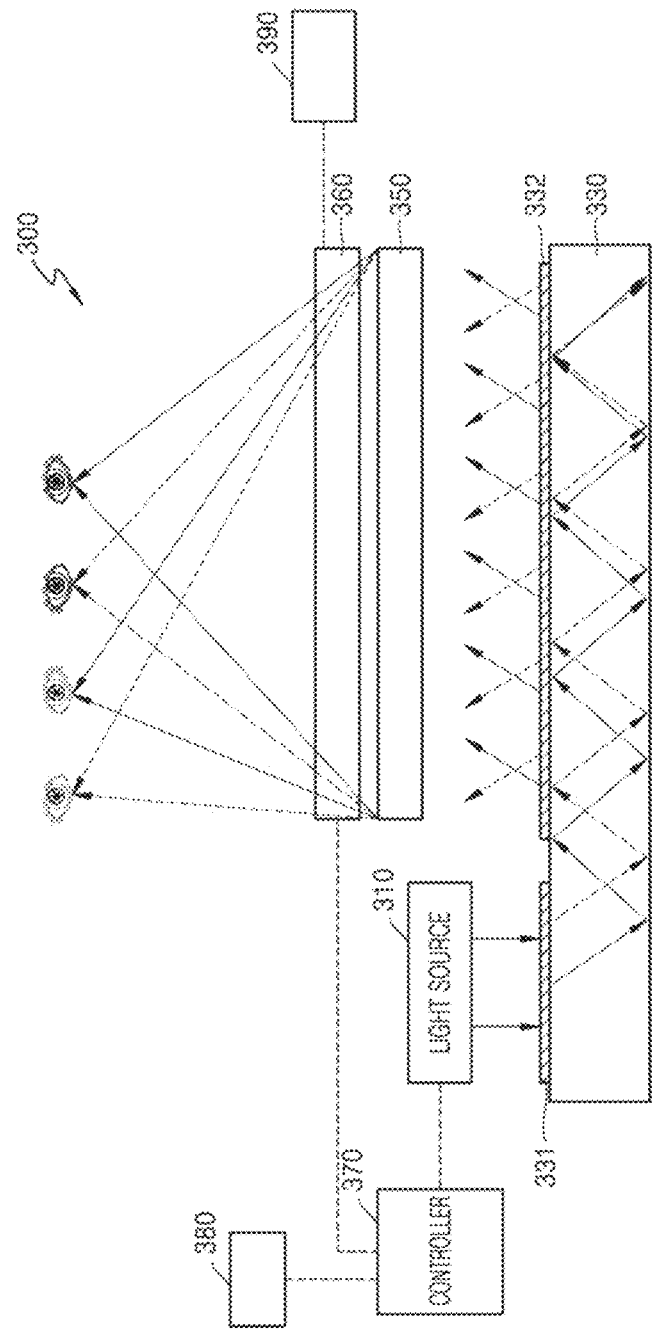
FIG. 14 schematically illustrates a three-dimensional display apparatus according to an example embodiment.

FIG. 14 is a cross-sectional view of a schematic structure of a three-dimensional display apparatus 300 according to an embodiment.

The three-dimensional display apparatus 300 may include a light source 310 configured to provide a beam, a light guide plate 330 configured to guide the beam from the light source 310, a geometric phase optical element 350 configured to change a deflection angle of the beam, and a spatial light modulator 360 configured to form a hologram image. Also, the three-dimensional display apparatus 300 may further include a controller 370 configured to control a geometric phase modulation optical system 350 to change a deflection angle. Also, a location detection sensor 380 configured to track a location of a viewer may also be included in the three-dimensional display apparatus 300.

The light source 310 may be substantially the same as the light source 210 described with reference to FIG. 13, and thus, a detailed description thereof will be omitted.

The light guide plate 330 may include transparent glass or transparent plastic. For example, as a material of the light guide plate 330, PMMA may be used. The geometric phase optical element 350 may change a deflection angle of light, which allows a change of a viewpoint of the three-dimensional display apparatus 300. Any of the geometric phase optical elements 100, 100A, and 100B, and the first and second geometric phase optical elements 110 and 120 described with reference to FIGS. 1 through 12 may be applied as the geometric phase optical element 350.

The spatial light modulator 360 may form a hologram pattern for diffracting and modulating an incident beam according to a hologram signal provided from an image signal processor 390.

The location detection sensor 380 may track a location of a viewer and transmit the location of the viewer to the controller 370. According to the location of the viewer, the controller 370 may control the geometric phase optical element 350 to direct the transmitted beam toward the eye of the viewer.

Referring to FIG. 14, with respect to the light guide plate 330, the light source 310 may be arranged in the same direction as the geometric phase optical element 350.

The controller 370 and the image signal processor 390 may be implemented using hardware, software, or any combination of hardware and software. The elements shown in FIG. 14, including the controller 370 and the image signal processor 390, may be implemented separately or in combination.

While the disclosure has been particularly shown and described with reference to example embodiments thereof, they are provided for the purposes of illustration and it will be understood by one of ordinary skill in the art that various modifications and equivalent other embodiments can be made from the disclosure.

The geometric phase optical elements according to example embodiments may adjust a deflection angle of light by applying a voltage. The geometric phase optical elements may adjust the deflection angle by having a simple structure and may increase the number of deflection angles.

The geometric phase optical elements according to the example embodiments may be applied to the three-dimensional display apparatuses. The three-dimensional display apparatuses may adjust the deflection angle of light and may display three-dimensional images on various locations.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A geometric phase optical element comprising:
a liquid crystal layer in which a liquid crystal is arranged and through which light is transmitted;
a first electrode on a surface of the liquid crystal layer; and
a second electrode on another surface of the liquid crystal layer,
wherein, when no voltage is applied to the first electrode and the second electrode, a phase difference, between first light having a first polarization state and second light having a second polarization state perpendicular to the first polarization state, according to an arrangement of the liquid crystal is $\pi$ and the transmitted light is diffracted by a first deflection angle,
wherein, when a first voltage is applied to the first electrode and the second electrode, the phase difference according to the arrangement of the liquid crystal is $\pi/2$ and the transmitted light is diffracted by a second deflection angle, wherein, when a second voltage is applied to the first electrode and the second electrode, the phase difference according to the arrangement of the liquid crystal is 0 and the transmitted light is diffracted by a third deflection angle, wherein the first deflection angle is larger than the second deflection angle, and wherein the second deflection angle is larger than the third deflection angle.

2. The geometric phase optical element of claim 1, wherein when no voltage is applied to the first and second electrode, the first deflection angle satisfies the following equation:

$$\sin \theta_1 = 2\lambda/p,$$

wherein $\theta_1$ indicates the first deflection angle, $\lambda$ indicates a wavelength of the transmitted light, and p indicates a pitch corresponding to a liquid crystal arrangement cycle of the liquid crystal layer.

3. The geometric phase optical element of claim 1, wherein the second deflection angle satisfies the following equation:

$$\sin \theta_2 = (\lambda/p),$$

wherein $\theta_2$ indicates the second deflection angle, $\lambda$ indicates a wavelength of the transmitted light, and p indicates a pitch corresponding to a liquid crystal arrangement cycle of the liquid crystal layer.

4. The geometric phase optical element of claim 1, wherein the third deflection angle is 0.

5. The geometric phase optical element of claim 1, wherein, when the first voltage is applied and incident light is left-handed circularly polarized light, the transmitted light diverges.

6. The geometric phase optical element of claim 5, wherein the transmitted light has a phase difference of $\varphi+\pi/4$ with respect to the incident light, wherein $\varphi$ indicates an angle between a direction of a liquid crystal arrangement cycle of the liquid crystal layer and a crystalline axis of the arrangement of the liquid crystal.

7. The geometric phase optical element of claim 1, wherein, when the first voltage is applied and incident light is right-handed circularly polarized light, the transmitted light converges.

8. The geometric phase optical element of claim 7, wherein the transmitted light has a phase difference of $\varphi-\pi/4$ with respect to the incident light, wherein $\varphi$ indicates an angle between a direction of a liquid crystal arrangement cycle of the liquid crystal layer and a crystalline axis of the arrangement of the liquid crystal.

9. A geometric phase optical element structure comprising a plurality of geometric phase optical elements of claim 1.

10. The geometric phase optical element structure of claim 9, wherein, when the number of the plurality of geometric phase optical elements is N, the number of different deflection angles of light diffracted by the geometric phase optical elements is $3^N - N + 1$.

11. The geometric phase optical element of claim 1, wherein the liquid crystal layer comprises at least one from among an electrically controlled birefringence (ECB) mode, a vertical alignment (VA) mode, a hybrid mode, and a twisted nematic (TN) mode.

12. A three-dimensional display apparatus comprising:
a light source;
a light guide plate configured to guide a beam incident from the light source;
at least one geometric phase optical element configured to change a deflection angle of light incident from the light guide plate; and
a spatial light modulator configured to form a hologram image using light transmitted through the at least one geometric phase optical element,
wherein the at least one geometric phase optical element comprises a liquid crystal layer in which a liquid crystal is arranged and through which the incident light is transmitted, a first electrode on a surface of the liquid crystal layer, and a second electrode on another surface of the liquid crystal layer,
wherein, when no voltage is applied to the first electrode and the second electrode, a phase difference, between first light having a first polarization state and second light having a second polarization state perpendicular to the first polarization state, according to an arrangement of the liquid crystal is $\pi$ and light transmitted through the liquid crystal layer is diffracted by a first deflection angle,
wherein, when a first voltage is applied to the first electrode and the second electrode, the phase difference according to the arrangement of the liquid crystal is $\pi/2$ and the transmitted light is diffracted by a second deflection angle,
wherein, when a second voltage is applied to the first electrode and the second electrode, the phase difference according to the arrangement of the liquid crystal is 0 and the transmitted light is diffracted by a third deflection angle,
wherein the first deflection angle is larger than the second deflection angle, and
wherein the second deflection angle is larger than the third deflection angle.

13. The three-dimensional display apparatus of claim 12, wherein the first deflection angle satisfies the following equation:

$$\sin \theta_1 = 2\lambda/p,$$

wherein $\theta_1$ indicates the first deflection angle, $\lambda$ indicates a wavelength of the transmitted light, and p indicates a pitch corresponding to a liquid crystal arrangement cycle of the liquid crystal layer.

14. The three-dimensional display apparatus of claim 12, wherein the second deflection angle satisfies the following equation:

$$\sin \theta_2 = (\lambda/p),$$

wherein $\theta_2$ indicates the second deflection angle, $\lambda$ indicates a wavelength of the transmitted light, and p indicates a pitch corresponding to a liquid crystal arrangement cycle of the liquid crystal layer.

15. The three-dimensional display apparatus of claim 12, wherein the third deflection angle is 0.

16. The three-dimensional display apparatus of claim 12, wherein, when the first voltage is applied and the incident light is left-handed circularly polarized light, the transmitted light diverges.

17. The three-dimensional display apparatus of claim 16, wherein the transmitted light has a phase difference of $\varphi+\pi/4$ with respect to the incident light, wherein $\varphi$ indicates an angle between a direction of a liquid crystal arrangement cycle of the liquid crystal layer and a crystalline axis of the arrangement of the liquid crystal.

18. The three-dimensional display apparatus of claim 12, wherein, when the first voltage is applied and the incident light is right-handed circularly polarized light, the transmitted light converges.

19. The three-dimensional display apparatus of claim 18, wherein the transmitted light has a phase difference of $\varphi-\pi/4$ with respect to the incident light, wherein $\varphi$ indicates an angle between a direction of a liquid crystal arrangement cycle of the liquid crystal layer and a crystalline axis of the arrangement of the liquid crystal.

20. The three-dimensional display apparatus of claim 12, wherein the at least one geometric phase optical element comprises a plurality of geometric phase optical elements.

21. The three-dimensional display apparatus of claim 20, wherein, when the number of the plurality of geometric phase optical elements is N, the number of different deflection angles of light diffracted by the plurality of geometric phase optical elements is $3^N-N+1$.

* * * * *